(12) United States Patent
Ceney (10) Patent No.: US 9,933,004 B2
(45) Date of Patent: Apr. 3, 2018

(54) LOAD-INDICATING DEVICE

(71) Applicant: FASTENERS SOLUTIONS LIMITED, Willenhall, West Midlands (GB)

(72) Inventor: Stanley Ceney, South Staffs (GB)

(73) Assignee: Tenscon Limited, Penn, Wolverhampton, (GB)

( * ) Notice: Subject to any disclaimer, the term of this patent is extended or adjusted under 35 U.S.C. 154(b) by 358 days.

(21) Appl. No.: 14/759,074

(22) PCT Filed: Jan. 6, 2014

(86) PCT No.: PCT/GB2014/050018
§ 371 (c)(1),
(2) Date: Jul. 2, 2015

(87) PCT Pub. No.: WO2014/106752
PCT Pub. Date: Jul. 10, 2014

(65) Prior Publication Data
US 2015/0337884 A1    Nov. 26, 2015

(30) Foreign Application Priority Data
Jan. 4, 2013   (GB) .................................. 1300093.0

(51) Int. Cl.
*F16B 31/02*       (2006.01)
*G01L 1/04*        (2006.01)
(Continued)

(52) U.S. Cl.
CPC ............ *F16B 31/02* (2013.01); *F16B 31/028* (2013.01); *G01B 5/30* (2013.01); *G01L 1/04* (2013.01); *G01L 5/00* (2013.01); *F16B 31/025* (2013.01)

(58) Field of Classification Search
CPC ...... F16B 31/02; F16B 31/025; F16B 31/028; G01L 1/04; G01L 5/00; G01B 5/30
See application file for complete search history.

(56) References Cited

U.S. PATENT DOCUMENTS 2,725,843 A * 12/1955 Koski ................. E21D 21/0093
                                                    116/212
2,830,486 A *  4/1958 Dillon ................... F16B 31/028
                                                    116/DIG. 34
(Continued)

FOREIGN PATENT DOCUMENTS

GB      2289115 A     11/1995
WO   2009060270 A1     5/2009
WO   2010140002 A1    12/2010

OTHER PUBLICATIONS

PCT Search Report and Written Opinion for Application No. PCT/GB2014/050018 dated Jan. 13, 2015 (14 pages).

*Primary Examiner* — Randy Gibson
(74) *Attorney, Agent, or Firm* — Michael Best & Friedrich LLP (57) ABSTRACT

The present invention provides improved load-indicating devices for use with structural assemblies that require accurate tensioning of fastening components such as nuts and bolts. In one embodiment, the load-indicating device comprises a body portion defining a bore extending therethrough, a movable member disposed in at least part of the body portion and configured to move in a direction substantially orthogonal to the axis of the bore, and an adjustment means coupled to the movable member and operable to displace the movable member when the body portion is compressed.

16 Claims, 10 Drawing Sheets

(51) Int. Cl.
*G01L 5/00* (2006.01)
*G01B 5/30* (2006.01)

(56) References Cited

U.S. PATENT DOCUMENTS

| | | | | | |
|---|---|---|---|---|---|
| 3,060,731 | A | * | 10/1962 | Adise | F16B 31/028 116/DIG. 34 |
| 3,151,258 | A | * | 9/1964 | Sonderegger | G01L 1/16 257/417 |
| 3,559,474 | A | * | 2/1971 | Gurol et al. | G01L 1/2218 338/5 |
| 4,090,399 | A | * | 5/1978 | Babcock | G01B 5/30 116/DIG. 34 |
| 5,222,399 | A | * | 6/1993 | Kropp | F16B 31/028 177/210 R |
| 5,291,789 | A | * | 3/1994 | Walton | F16B 31/025 73/761 |
| 5,584,627 | A | * | 12/1996 | Ceney | F16B 31/025 116/DIG. 34 |
| 6,892,585 | B2 | * | 5/2005 | Clarke | F16B 31/025 411/14 |
| 7,698,949 | B2 | * | 4/2010 | Akdeniz | G01L 5/243 310/322 |
| 8,833,181 | B1 | * | 9/2014 | Rowe | G01L 1/04 73/862.581 |

* cited by examiner

LOAD-INDICATING DEVICE

CROSS-REFERENCE TO RELATED APPLICATIONS

This is a U.S. national stage entry of International Patent Application No. PCT/GB2014/050018, filed on Jan. 6, 2014, which claims priority to Great Britain Patent Application No. 1300093.0, filed on Jan. 4, 2013, the entire contents of all of which are fully incorporated herein by reference.

The present invention relates to improved load-indicating devices and particularly to improved load-indicating nuts and washers for providing an indication of a predetermined tension between fastening components.

It is commonly known that if fastening components, such as nuts and bolts etc. are not correctly tensioned or secured together with the correct compressive force or load, then those components are likely to eventually fail or come apart or otherwise experience some form of mechanical fatigue. Accordingly, there are therefore numerous mechanical problems that may potentially result if a structural assembly comprising such fastening components is either under-loaded or over-loaded (i.e. under tensioned or over tensioned respectively).

Typically, an under-loaded condition will usually result in fatigue and failure of the structural components as external oscillating forces will generally be present. For example, if the oscillating forces act through a nut and bolt, with the tensioning of the nut and bolt being insufficient, the bolt will generally fail by either fracturing (due to fatigue) or otherwise will eventually become loose due to the oscillating forces.

In an over-loaded condition, the nut and bolt usually experience stresses that again may lead to failure of the fastening components. Therefore, if the tightening tension is too high, the bolt and/or nut, or their threads, will typically exceed their design load usually resulting in fracture or breakage of the components.

Accordingly it is very important to impart the correct tension, load or tightening force to fastening components to ensure the structural integrity of a mechanical assembly, which thereby increases longevity and/or safety of machines and assemblies.

A common technique for tensioning fastening components, of the likes of nuts and bolts, is to use a device such as a torque wrench to apply a tightening load. However, such devices usually have the inherent drawback of using up to approximately 90% of the effort (depending on lubrication) to overcome frictional resistance in the different fastening components. Therefore, it may prove to be very difficult to overcome the unpredictable frictional resistances with only approximately 10% of the remaining effort being available to thereby to ensure the correct tensioning load is applied to the fastening components. Consequently, this technique of tightening can be inaccurate for some tightening applications, leading to possible under-loading or over-loading of fastening components, without the operator being aware of such a condition being present.

Load-indicating devices which address many of the problems encountered in the prior art, are described in the co-pending published PCT application WO 2013/030567, the contents of which are incorporated herein by reference.

The present invention provides improvements, modifications and enhancements to load-indicating devices, as well as describing further advantageous solutions to allow reliable and consistent tensioning of fastening components.

According to a first aspect of the present invention there is provided a load indicating device, comprising:
 a body portion defining a bore extending therethrough;
 a movable member disposed in at least part of the body portion and configured to move in a direction substantially orthogonal to the axis of the bore; and
 an adjustment means coupled to the movable member and operable to displace the movable member when the body portion is compressed.

The provision of a load-indicating device comprising at least a movable member which is configured to move in a direction substantially orthogonal to the body portion of the device under the action of an adjustment means coupled to the movable member as the body is compressed, is found to be particularly advantageous as the device is able to provide a reliable and accurate indication of the tension or load between two fastening components disposed either side of the body portion of the device.

In particular, due to the inherently adjustable nature of the adjustment means, the device may consequently be 'fine-tuned' so that the degree of displacement of the movable member can be accurately controlled by setting the adjustment means to suit the particular tension or loading requirement. Therefore, as the body portion is compressed the adjustment means acts on the movable member to bring about a pre-determinable displacement of the member which can then be detected as described in the following embodiments.

In exemplary embodiments the body portion of the device may be in the form of a nut or a washer. The nut may be of any size and may be scaled to suit the particular application, with the bore of the body portion being threaded. For embodiments in which the body portion takes the form of a washer, a nut or other conventional securing component will typically be used to secure the joint or mechanical assemblies, with the washer being 'sandwiched' between the nut and the joint etc.

Therefore, the device of the present invention may be deployed in any arrangement in which two or more mechanical assemblies are to be connected together. In this way, the present device makes it possible to tighten fastening components to a desired or predetermined tension without the need for a torque wrench or other mechanical (tension) measuring means. Hence, an operator, such as an engineer or mechanic, can be assured that in using the device of the present invention the required tension can be achieved without concern that the fastening components have been under- or over-loaded.

In preferred embodiments, the adjustment means may be coupled to the movable member via a resilient means. Most preferably, the resilient means may take the form of a spring clip that pushes against the movable member and which is acted upon by the adjustment means when the body portion is compressed (e.g. when the nut or washer are under tension).

The adjustment means preferably comprises an adjustment screw, which in exemplary embodiments is disposed so as to be substantially parallel to the axis of the bore of the body portion. In this way, as the body portion is compressed (along the direction of the bore axis) the adjustment screw moves along the bore axis and pushes downwardly on the spring clip, which in turn brings about a measurable displacement of the movable member.

In preferred embodiments, the adjustment screw is disposed in the body of the body portion itself, which is achieved by drilling into the body of the nut or washer substantially parallel to the axis of the bore.

The movable member most preferably takes the form of a gauge pin, which in exemplary embodiments is located within a gauge pin housing preferably disposed within at least part of the body portion. Typically, a hole in the side wall of the nut or washer may be drilled out to accommodate the gauge pin housing, which is intended to sit securely within the hole. To prevent fluid (e.g. oil or water etc.) ingress between the housing and the hole, a seal, such as an 'O'-ring seal, may be disposed around the outer edge of the housing.

The gauge pin is located within the housing and is able to move substantially orthogonally to the axis of the bore, such that the gauge pin moves in an essentially radial direction to the body of the nut or washer.

A biasing means is preferably attached to the gauge pin. The function of the biasing means is to restore the pin to its original position when the tension or compression is removed from the body portion (i.e. when the nut is released). The biasing means may preferably comprise a helical spring. However, any suitable resilient means may alternatively or additionally be used to restore the gauge pin to its original position.

The inner end of the gauge pin (i.e. the end closest to the bore) is preferably attached to the spring clip, which pushes against the gauge pin (and spring) by action of the adjustment screw, when the nut or washer is compressed. In this way, vertical motion of the adjustment screw may then be converted into a measurable radial (i.e. horizontal) displacement of the gauge pin, which in turn may be used to determine the degree of compressive loading of the nut or washer.

The other end of the gauge pin preferably terminates in an end cap, which serves as a displaceable contact surface that moves when the pin is displaced horizontally. In exemplary embodiments, the present device further comprises a load detecting means that is operable to detect the displacement of the gauge pin relative to the body of the nut or washer. The load detecting means may preferably take the form of an attachable probe that can be attached to the gauge pin housing via magnetic means or any other suitable attachment mechanism (e.g. a bayonet fitting or locking clip etc.).

In a preferred embodiment, the probe comprises a linear transducer that is operable to convert any detected displacement of the gauge pin into a corresponding voltage level. Preferably, the end cap of the gauge pin engages with a contact surface of the linear transducer, which then brings about a linear displacement of the transducer within the attached probe as the pin moves. The resulting voltage level may be converted into an equivalent load by virtue of a pre-calibrated device and/or theoretical or empirical model, which in turn enables an operator to determine the degree of loading of the nut or washer.

In preferred embodiments, the probe is in communication with a handheld monitoring device comprising a display, such as an LCD or TFT screen etc. and/or an indicator, such as an LED or bulb etc. In this way, the loading of the nut or washer can be conveyed to the operator either as a numerical value (e.g. the exact load in newtons or a % load etc.) or via some form of illuminated display, e.g. a coloured sequence of lights etc. or both. Indeed, any suitable form of data presentation may be used to indicate the loading of the device.

The probe may be physically connected to the handheld monitoring device via a cable or wire, or alternatively via a wireless connection, such as WiFi or a cellular telecommunications network. Moreover, the probe may also be configured to provide a text based message, such as a SMS type message, to a handheld monitoring device or smart phone etc., with the message providing the current degree of loading of the device.

Indeed, as will be appreciated the present device may therefore not only be configured to provide information regarding the loading of the device during initial tightening of the joint or mechanical assemblies, by may also serve as a long-term monitoring system by being able to provide periodic updates or warnings to a central server, handheld device or smart phone etc. to thereby notify an operator that attention is required for a particular nut or group of nuts that may require re-tightening.

Although the above embodiment was described in relation to a linear transducer, it is be understood that any other suitable form of sensor or detector may alternatively (or additionally) be used with the present device. In particular, in other embodiments the capacitance of an air gap between the end cap of the gauge pin and the probe may be measured to derive a corresponding voltage. As the end cap moves (due to compression of the nut or washer) the capacitance of the air gap will change, which in turn can be used to determine the loading on the device via a pre-calibrated device or model data.

In much the same way, an embodiment based on measuring eddy currents may also be used to determine the loading on the device, as again changes in the air gap between the end cap of the gauge pin and the probe will alter the measured eddy currents, which can be used to derive a corresponding voltage.

Other embodiments may be based on ultrasound or direct imaging of the displacement using a borescope etc. In the ultrasound embodiment, ultrasonic pulses may be emitted by the probe and the 'bounce-back' time from the end cap may be measured. Changes in the end cap position will produce variations in the bounce-back timings so that the displacement of the gauge pin can be accurately determined. As a result, the loading on the device may be calculated via a pre-calibrated device or model data. In a similar way, laser pulses could alternatively be used to determine the displacement of the pin by measuring the light travel time of the reflected pulse of light.

According to a second aspect of the present invention there is provided a load indicating device, comprising:
a body portion defining a bore extending therethrough;
an aperture extending at least partly through the body portion in a direction substantially orthogonal to the axis of the bore; and
imaging means disposed proximate to the aperture and operable to detect a change in a visual characteristic of the aperture when the body portion is acted upon by a compressive force.

In embodiments of this aspect of the present invention the device need not comprise a movable member. But instead the device comprises at least one aperture which is monitored by any suitable form of imaging means, so as to be able to detect a change in a visual characteristic of the aperture when the body portion of the device is acted upon by a compressive load. Notable advantages of this particular aspect include: a reduced number of components in the device, simpler fabrication of the device (less machining), very low maintenance and longevity of use and re-use (due to the reduced number of mechanical parts).

In exemplary embodiments the body portion may take the form of a nut or a washer, as described in the above embodiments. The nut or washer are inherently scalable and may be used with any mechanical joint or assembly requiring the fixing or connection of two or more mechanical components at a required tension or compression (i.e. pre-load).

By 'visual characteristic' we mean at least one of the shape, size and reflectance of the aperture. The reflectance being determined by the amount of incident light on the aperture (and its associated/surrounding surfaces) that is reflected back from the aperture as described below.

The aperture may be of any shape, and is most preferably circular. The aperture may extend all the way through the body of the nut or washer from its outer surface (i.e. outer side) to the bore. Alternatively, the aperture may extend only partly through the body portion and as such will be closed at one end (i.e. nearest to the bore).

The imaging means most preferably comprises a borescope having an internal light source for illuminating the aperture. Preferably, a direct imaging camera, such as a video camera, is coupled to the borescope in order to directly view the aperture, either in situ or remotely via a video feed, which may be transmitted through a cable or wire, or wirelessly via WiFi and/or across the Internet.

As the device is compressed (i.e. placed under tension) the body portion deforms, thereby altering the shape and size of the aperture. The imaging means may be configured to detect changes in the shape or size of the aperture and to thereby notify an operator of the level of loading of the device (as compared to a pre-calibrated device and/or model data). In addition, or alternatively, as a result of the change in the shape and size of the aperture the amount of light reflected from the aperture will change, which again can be detected via the borescope/video camera feed. Therefore, as the reflected light changes, the amount of loading on the device can be determined via reference to a pre-calibrated device and/or model data.

To increase the reflectivity from the aperture, the interior surfaces and/or surrounding surfaces of the aperture may be 'silvered' or aluminised to ensure sufficient light is reflected fro imaging purposes. Therefore, changes in the shape and size of the aperture will cause variations in the amount of reflected light, which provided appropriate calibrated data is available, can be directly converted into a corresponding device load.

As will be appreciated, any suitable imaging means may be used with the present device, without sacrificing any of the benefits of this aspect of the present invention.

Of course, it is be understood that the nut or washer may be fabricated to include any number of apertures to provide an accurate indication of the symmetrical loading of the device and of the associated mechanical components. Therefore, multiple imaging means may be deployed around the circumference of the body portion, coincident with a respective deformable aperture, so as to monitor changes in the visual characteristics of the apertures when the device is under compression.

According to a third aspect of the present invention there is provided a load indicating device, comprising:
  a body portion defining a bore extending therethrough; and
  a first electrode and a second electrode;
  wherein the first electrode is disposed in at least part of the body portion and the second electrode is operable to move between a first position, in which the second electrode is spaced from the first electrode, and a second position, in which the second electrode is in electrical contact with the first electrode, in response to a predetermined compressive load being applied to the body portion.

The basic principle of the embodiments according to this aspect of the present invention, relate to the completion of an electrical circuit when the body portion of the device reaches a predetermined compressive load. Therefore, the second electrode is arranged to be movable between first and second positions corresponding to a state in which there is no electrical connection between the first and second electrodes (i.e. when the nut or washer are under-tensioned relative to the predetermined compressive load) and a state in which the first and second electrodes are in electrical contact, enabling the passage of a current therebetween (i.e. when the nut or washer has been tensioned to the predetermined compressive load), respectively.

In exemplary embodiments, the second electrode is therefore spaced from the first electrode preferably by an air gap. Preferably, the spacing or size of the air gap is adjustable and can therefore be 'fined-tuned' to match the compressive loads and predetermined tension required in the nut or washer. Preferably in some embodiments, the second electrode is in the form of an (electrically conductive) adjustment screw that is preferably disposed in the body of the nut or washer. The screw may preferably be substantially parallel to the axis of the bore. In such embodiments, the first electrode preferably takes the form of a electrically conductive pin, which may be aligned substantially orthogonally to the axis of the bore (i.e. radial to the bore).

The first and second electrodes are thus initially separated by the air gap, whereupon with successive loading of the nut or washer they are gradually brought into electrical contact as the air gap closes. To prevent a short circuit, at least the first electrode may be electrically insulated from the body portion, such that the only exposed part of the first electrode is that which is brought into contact with the movable second electrode.

In an alternative embodiment, the second electrode may comprise a resilient member, such as an electrically conductive spring clip, coupled to an adjustment screw. The resilient member is preferably arranged to be compressed by the screw when the body portion is under tension, which causes the resilient member to deform such that it flexes towards the first electrode. With successive compression the resilient member thereby makes direct electrical contact with the first electrode forming a current path between the first and second electrodes.

The device further comprises a detachable probe for electrical coupling to the first and second electrodes. The probe preferably comprises third and fourth electrodes for respective coupling to the first and second electrodes to thereby form a complete electrical circuit when the nut or washer is compressed to the predetermined compressive load.

The probe may preferably be attached to the nut or washer via magnetic means or any other suitable attachment mechanism (e.g. a bayonet fitting or locking clip etc.), thereby enabling the first and second electrodes to directly connect to the third and fourth electrodes, respectively.

In preferred embodiments, the probe is connected to a handheld monitoring device either via a cable or wire, or alternatively via a wireless connection, e.g. WiFi etc.

A display means is preferably integrated into the handheld monitoring device or alternatively is attached to the probe or device. In preferred embodiments, the display means comprise a pair of LEDs, preferably of different colour, for example red and green. When the electrical circuit is 'open', namely when the first and second electrodes are spaced apart (i.e. when the nut or washer is under-tensioned) the red LED is illuminated; whereas when the device is tensioned to the predetermined compressive load, the red LED extinguishes in preference to an illuminated green LED, namely when the first and second electrodes come into electrical contact. Hence, an operator can easily and quickly determine when the desired load on the device has been achieved.

Of course, any suitable combination and/or sequence of illuminated light sources may be used to notify an operator of the loading condition, as well as the use of numerical data displayed via a LCD or TFT screen etc. Therefore, the handheld monitoring device may take any appropriate form and/or use any type of visual indicator depending on the particular implementation.

According to a fourth aspect of the present invention there is a provided a load indicating device, comprising:
a body portion defining a bore extending therethrough;
a light source;
a light detector for receiving light from the source; and
a first opaque member operable to attenuate the passage of light between the source and the detector;
wherein the opaque member is arranged to move in response to compression of the body portion to thereby cause a change in the state of the light communicated between the source and the detector when a predetermined preload is applied to the body portion.

The body portion of the device may be in the form of a nut or a washer.

In an exemplary embodiment, the light source may be a photodiode and the light detector may be a phototransistor. The first opaque member may be an adjustable screw, preferably disposed in the body portion, such that the screw is preferably substantially parallel to the bore. In much the same manner as some of the preceding embodiments, the adjustment screw is intended to move with compression of the body portion. Therefore, as the nut or washer is tensioned, the screw displaces substantially along the direction of the bore axis.

The adjustment screw is preferably opaque to visible or infra-red (IR) light and therefore is able to attenuate any light transmitted between the photodiode and the phototransistor.

In this embodiment, the present device further comprises a second opaque member preferably in the form of an abutment member that is disposed within the body portion and preferably aligned with the adjustment screw substantially along the direction of the bore axis. Preferably, the adjustment screw and the abutment member are separated by an adjustable air gap when the body portion is uncompressed below a predetermined preload. As the nut or washer is subsequently tensioned, the adjustment screw is therefore forced towards the abutment member so that the air gap gradually begins to close.

In this embodiment, the photodiode and the phototransistor are preferably disposed on opposite sides of the air gap, such that light communication is possible along a light path defined therethrough. However, as the compression of the nut or washer increases, the adjustment screw begins to abut against the abutment member, until such time the predetermined preload is achieved, whereupon the air gap closes completely and the screw and abutment member come into direct contact. As a result, the light communicated between the photodiode and phototransistor is thereby interrupted (namely fully attenuated), causing a change in the state of the communicated light.

This change of state may consequently be used to notify an operator that the desired preload on the nut or washer has been achieved.

Preferably, a controller in the form of an attachable device may be configured to identify when the change of state occurs (i.e. when the phototransistor no longer registers any incident light) and may therefore provide a visual indication or other form of alert or message etc. to the operator that the nut or washer is at the required tension.

In alternative embodiment, a reverse situation may be used to notify the operator that the required preload on the nut or washer has been achieved. In this embodiment, the first opaque member may be arranged to inhibit and attenuate the transmission of light between the light source and the light detector, such that only when the opaque member is displaced (due to tensioning of the device) is light able to pass between source and detector.

In such an embodiment, the source and the detector are linkable via a pair of opposing fibre optics, which define a light path therebetween. The first opaque member preferably comprises a pivotable light shield which is disposed between the opposing fibre optics, such that it is aligned substantially transversely to the light path.

An adjustment screw is preferably disposed within the body portion and is operable to displace the light shield upon compression of the nut or washer. The adjustment screw is preferably aligned substantially parallel to the axis of the bore and consequently moves along this direction as the nut or washer is compressed. The adjustment screw is preferably arranged to abut against the pivotable light shield, such that as the tension on the nut or washer is increased the screw pushes downwardly on the light shield causing it to pivot away from the blocked light path of the opposing fibre optics.

As a result, the action of the pivoting light shield is able to cause a change in the state of the light communicated between the source and the detector, with the light being able to pass uninhibited between the opposing fibre optics with zero attenuation.

A controller in the form of an attachable device may be configured to identify when the change of state occurs (i.e. when the detector receives light from the fibre optic) and may therefore provide a visual indication or other form of alert or message etc. to the operator that the nut or washer is at the required tension.

The light shield is preferably biased to return to its original (attenuating) position by a biasing means, such as a spring etc. The spring thereby restores the light shield to a position which interrupts the light communication between the opposing fibre optics, when the tension is removed from the nut or washer.

Of course, any suitable light source and light detector may be used in conjunction with this aspect of the present invention without sacrificing any of the benefits or advantages of these embodiments.

In some embodiments of the above aspects, the nut or washer may advantageously be reused for other applications by reaming out the one or more bores in the body portion of the nut or washer to the required size. Therefore, the load-indicating device can be recycled and/or retro-fit to any mechanical assembly.

The nut or washer is preferably heat treated during fabrication to improve the performance of the device. Moreover, the nut or washer may also be covered with a plastic or plastics material coating, such as nylon, to prevent or inhibit corrosion over time. Of course, any suitable coating or material may be used in conjunction with the device of the present invention depending on the particular application.

It is to be appreciated in the present invention that the dimensions of the nut or washer can be fabricated according to any desired shape or size, and that by carefully selecting the type of material and resilience of the material the nut or washer can be optimised to deform by any amount according to any required compression. Therefore, the load-indicating device of the present invention can be used in numerous mechanical applications and can be scaled to whatever size the particular application requires.

It is to be appreciated that none of the aspects or embodiments described in relation to the present invention are mutually exclusive, and therefore the features and functionality of one aspect and/or embodiment may be used interchangeably or additionally with the features and functionality of any other aspect and/or embodiment without limitation.

Embodiments of the present invention will now be described in detail by way of example and with reference to the accompanying drawings in which.

Figure 1:
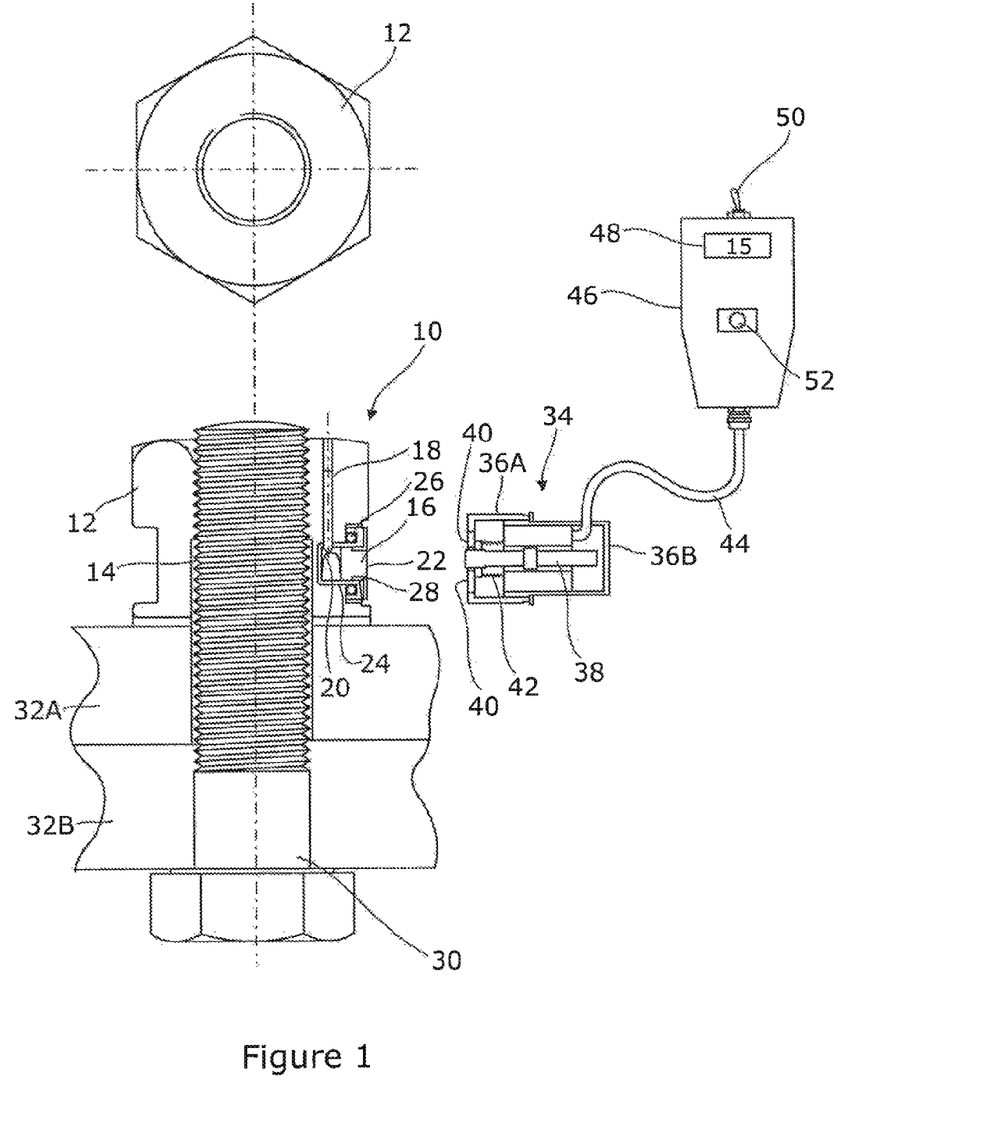
FIG. 1—shows a side cross-sectional view of a load-indicating device according to a preferred embodiment.

Referring to FIG. 1, there is a shown a particularly preferred embodiment of a load-indicating device 10 according to the present invention. The device 10 is shown in use in a typical situation, namely securing two mechanical components or assemblies 32A & 32B together (e.g. a mechanical support or joint etc.) via a conventional bolt 30. It is to be understood that the device as shown in FIG. 1 is not drawn to scale and therefore the figure is intended for illustrative purposes only.

The device 10 comprises a body portion 12 defining a bore 14 extending therethrough. The body portion 12 is in the form of a nut having an hexagonal perimeter, with the bore 14 being threaded for attachment to the bolt 30. A movable member 16 is disposed in a part of the body portion 12 and is configured to move in a direction substantially orthogonal to the axis of the bore 14, namely in a radial direction relative to the bore.

An adjustment means, in the form of an adjustment screw 18, is disposed in the body portion 12 and is aligned substantially parallel to the axis of the bore 14. The function of the adjustment screw 18 is to act on the movable member 16 via a resilient means, typically a spring clip 20, such that compression of the body portion 12 urges the adjustment screw 18 to move downwardly (in the sense of FIG. 1), which thereby deflects the spring clip 20 producing a detectable and measurable displacement of the movable member 16.

In the embodiment of FIG. 1, the moveable member 16 is in the form of a gauge pin comprising an end cap 22. The gauge pin 16 is located within a gauge pin housing 24, which is securely disposed within a drilled out recess or hole within the body of the body portion 12. To prevent fluid (e.g. oil or water etc.) ingress between the housing 24 and the hole, a seal, such as an 'O'-ring seal 26, is disposed around the outer edge of the housing 24, as shown in FIG. 1.

A biasing means, in the form of a helical spring 28, is attached to the gauge pin 16. The function of the spring 28 is to restore the pin 16 to its original position when the tension or compression is removed from the body portion 12 (i.e. when the nut is released). Therefore, the spring 28 acts against the 'pushing force' provided by the spring clip 20, which in turn is acted upon by the adjustment screw 18 when the nut is compressed.

The end cap 22 of the gauge pin 16 serves as a displaceable contact surface that moves when the pin 16 is displaced horizontally.

Figure 2:
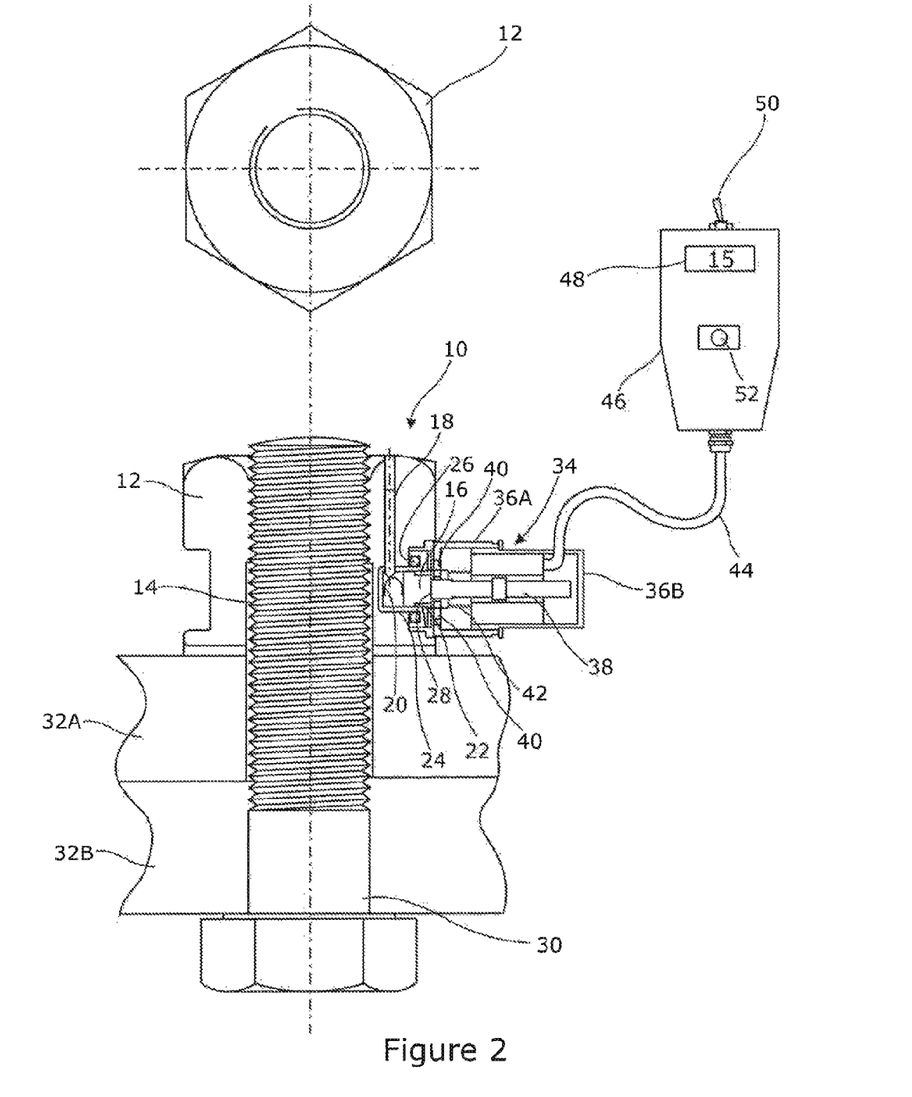
FIG. 2—shows a side cross-sectional view of the device of FIG. 1 with an example probe attached to the device.

As shown in FIGS. 1 & 2, the present device further comprises a load detecting means that is operable to detect the displacement of the gauge pin 16 relative to the body of the nut. In this embodiment, the load detecting means takes the form of an attachable probe 34 that can be attached to the gauge pin housing 24 via magnets 40 (cf. FIG. 2).

The probe 34 comprises a two-part housing, having a front portion 36A and a rear portion 36B, with the front portion 36A being able to slide over the rear portion 36B in a telescoping action.

A linear transducer 38 in the probe 34 is operable to convert any detected displacement of the gauge pin 16 into a corresponding voltage level. The end cap 22 of the gauge pin 16 engages with a contact surface of the linear transducer 38, which brings about a linear displacement of the transducer 38 within the attached probe 34 as the pin 16 moves (facilitated by the telescoping action of the probe housing). The resulting voltage level may be converted into an equivalent load by virtue of a pre-calibrated device and/or theoretical or empirical model, which in turn enables an operator to determine the degree of loading (or tensioning) on the device 10.

Typical displacements of the gauge pin are in the range of about 10 microns to about 500 microns. Although it will be appreciated that the displacement will depend on the particular implementation and required loading of the device.

In the embodiment of FIG. 1, the probe 34 is in communication with a handheld monitoring device 46 comprising a display 48, such as an LCD. In this way, the loading of the device 10 can be conveyed to the operator as a numerical value (e.g. the exact load in newtons or a % load etc.). A push button 52 is provided to activate/refresh the display 48, such that depressing the button 52 leads to a new reading being obtained from the probe 34. On 'On/Off' switch 50 is also provided to control the operating state of the handheld monitoring device 46, so that it may be turned off when the device is not in use etc.

Figure 3:
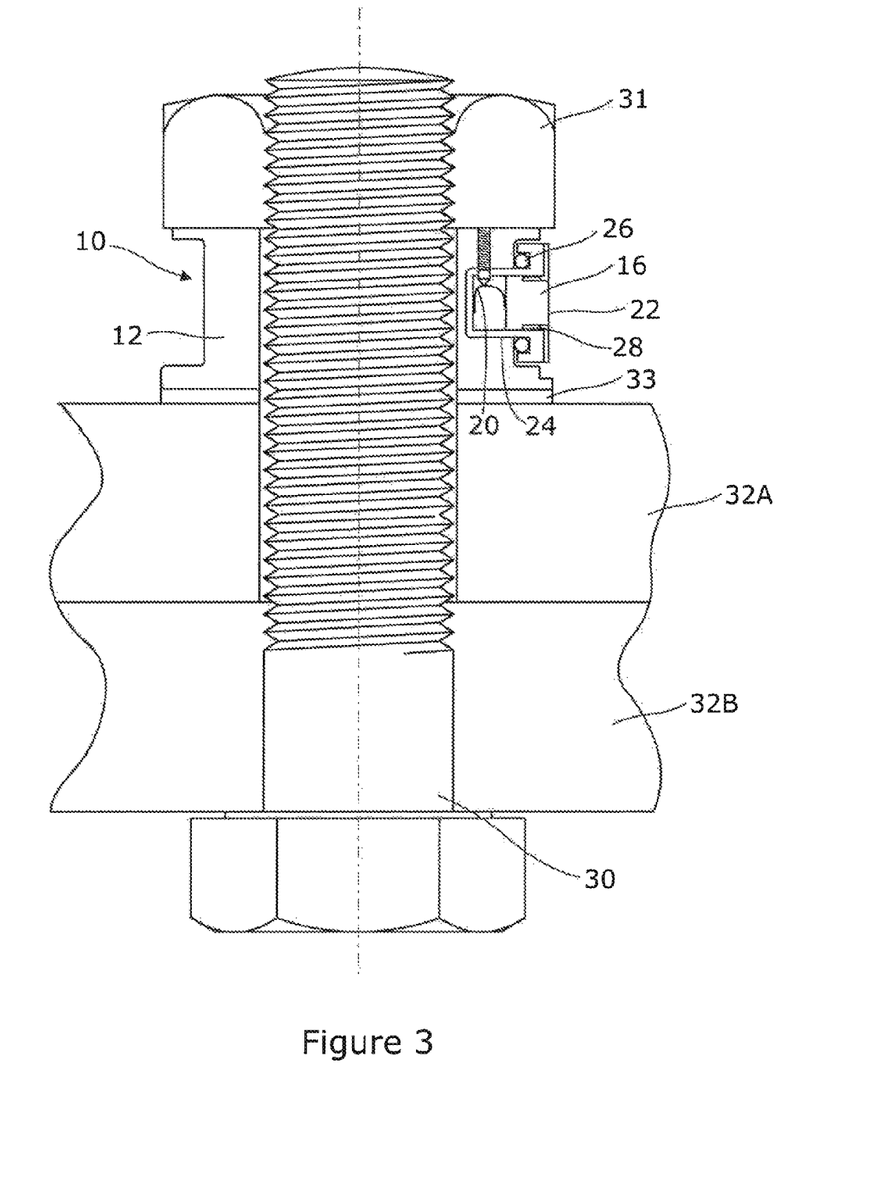
FIG. 3—shows a side cross-sectional view of a load-indicating device according to an alternative embodiment.

Referring to FIG. 3, there is shown an alternative embodiment of the loading-indicating device 10 according to the present invention. In this embodiment, the device functions in exactly the same way as in the embodiment of FIGS. 1 and 2, but instead the body portion of the device is in the form of a washer, which is 'sandwiched' between the mechanical assembly 32A and an overlying conventional nut 31. In this embodiment, the device undergoes tensioning by tightening the nut 31, as opposed to the previous embodiment, in which the device itself is tightened on the bolt 30.

As shown in FIG. 3, a hardened washer 33 may be inserted between the washer and the mechanical assembly 32A to prevent damage to the respective surfaces.

Figure 4:
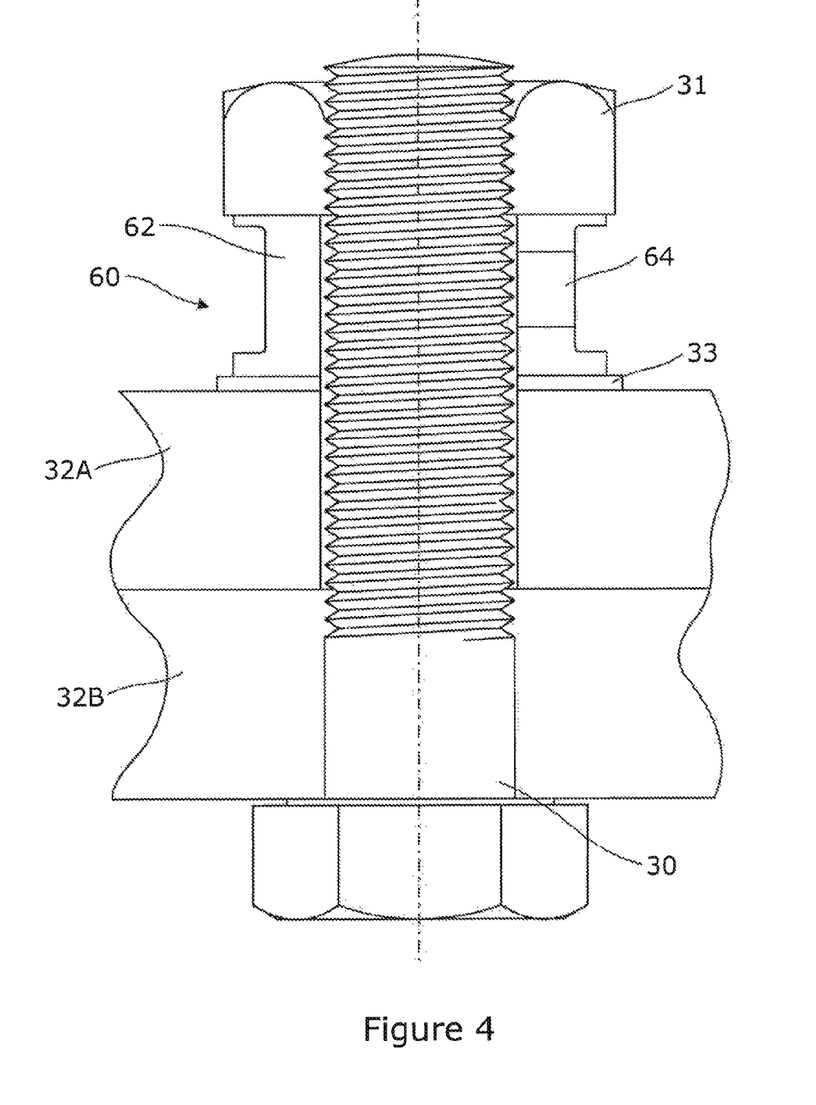
FIG. 4—shows a side cross-sectional view of a load-indicating device according to a different embodiment of the present invention.

A different embodiment of the present invention is illustrated in FIG. 4. In this embodiment, the device 60 need not comprise a gauge pin nor any moving components. Instead the device 60 comprises at least one aperture 64 which is monitored by an imaging means (not shown), so as to be able to detect a change in a visual characteristic of the aperture 64 when the body portion 62 of the device 60 is acted upon by a compressive load.

In the embodiment of FIG. 4, the body portion 62 takes the form of a washer, with a separate conventional nut 31 being used to tighten the mechanical assemblies 32A & 32B together with conventional bolt 30.

By 'visual characteristic' we mean at least one of the shape, size and reflectance of the aperture 64. The reflectance being determined by the amount of incident light on the aperture 64 (and its associated/surrounding surfaces) that is reflected back from the aperture.

The imaging means may typically comprise a borescope having an internal light source for illuminating the aperture 64. A direct imaging camera, such as a video camera, is coupled to the borescope in order to directly view the aperture 64, either in situ or remotely via a video feed, which may be transmitted through a cable or wire, or wirelessly via WiFi and/or across the Internet.

As the device 60 is compressed (i.e. placed under tension by the nut 31) the body portion 62 deforms, thereby altering the shape and size of the aperture 64. The imaging means is configured to detect changes in the shape or size of the aperture 64 and to thereby notify an operator of the level of loading of the device (as compared to a pre-calibrated device and/or model data). In addition, or alternatively, as a result of the change in the shape and size of the aperture 64, the amount of light reflected from the aperture will change, which again can be detected via a borescope/video camera feed. Therefore, as the reflected light changes, the amount of loading on the device can be determined via reference to a pre-calibrated device and/or model data.

To increase the reflectivity from the aperture 64, the interior surfaces and/or surrounding surfaces of the aperture may be 'silvered' or aluminised, and/or otherwise polished to ensure sufficient light is reflected for imaging purposes. Therefore, changes in the shape and size of the aperture 64 will cause variations in the amount of reflected light, which provided appropriate calibrated data is available, can be directly converted into a corresponding device load.

Figure 5A:
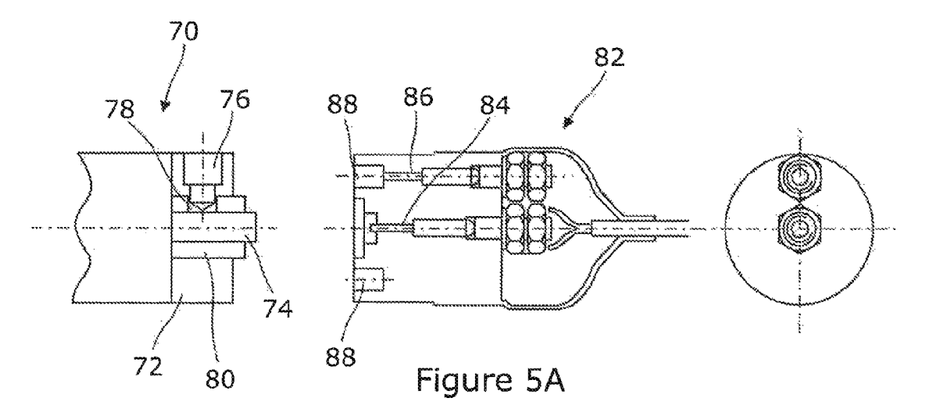
FIG. 5A—shows a side cross-sectional view of a load-indicating device and example probe according to another embodiment of the present invention.
Figure 5B:
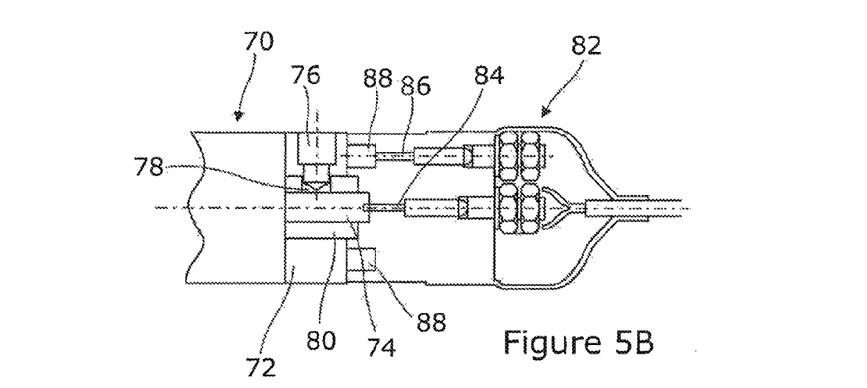
FIG. 5B—shows a side cross-sectional view of the device of FIG. 5A with the example probe attached to the device.

Referring now to FIGS. 5A & 5B, there is shown another embodiment of a load-indicating device 70 according to the present invention. The basic principle of this embodiment relates to the completion of an electrical circuit when the body portion 72 of the device 70 reaches a predetermined compressive load.

The device 70 comprises a first electrode 74 in the form of an electrically conductive pin, which is aligned substantially orthogonally to the axis of a bore (not shown) defined through the body of the body portion 72 (as in the preceding embodiments).

A second electrode 76 is arranged to be movable between first and second positions corresponding to a state in which there is no electrical connection between the first and second electrodes (i.e. when the body portion 72 is under-tensioned relative to the predetermined compressive load) and a state in which the first and second electrodes are in electrical contact, enabling the passage of a current therebetween (i.e. when the body portion has been tensioned to the predetermined compressive load), respectively.

In the embodiment of FIG. 5A, the second electrode 76 is in the form of an electrically conductive adjustment screw that is disposed in the body of the body portion 72. The second electrode 76 is aligned substantially along the direction of the bore axis and is initially spaced from the first electrode 74 by an air gap 78. The spacing or size of the air gap 78 is adjustable (by virtue of the adjustment screw) and can therefore be 'fined-tuned' to match the compressive loads and predetermined tension required in the device.

Successive compression of the body portion 72 gradually brings the first and second electrodes 74 & 76 into electrical contact as the air gap 78 closes (due to the downward motion of the second electrode 76—in the sense of FIG. 5A). To prevent a short circuit, the first electrode 74 is electrically insulated from the body portion 72 by insulating layer 80, such that the only exposed part of the first electrode 74 is that which is brought into contact with the movable second electrode 76.

As shown in FIGS. 5A & 5B, the load-indicating device 70 further comprises a detachable probe 82 for electrical coupling to the first and second electrodes 74 & 76. The probe 82 comprises third and fourth electrodes 84 & 86 for respective coupling to the first and second electrodes 74 & 76 to thereby form a complete electrical circuit when the body portion 72 is compressed to the predetermined compressive load.

The probe 82 is attached to the body portion 72 via magnets 88, enabling the first and second electrodes 74 & 76 to directly connect to the third and fourth electrodes 84 & 86, respectively, as shown in FIG. 5B. (It is noted for clarity that electrode 86 passes behind magnet 88 in FIGS. 5A & 5B, and therefore is not electrically coupled to electrode 76 via the magnet as it may appear from the figures).

Figure 5C:
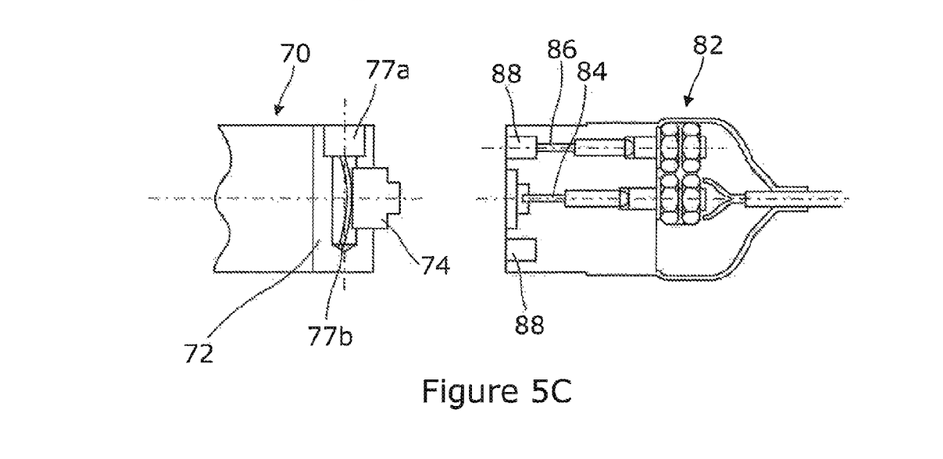
FIG. 5C—shows a side cross-sectional view of a load-indicating device and example probe according to another embodiment of the present invention.

Referring now to FIG. 5C, in an alternative embodiment the second electrode may comprise a resilient member 77b, in the form of an electrically conductive spring clip, coupled to an adjustment screw 77a. The spring clip 77b is arranged to be compressed by the screw 77a when the body portion 72 is under tension, which causes the spring clip 77b to deform such that it flexes towards the first electrode 74. With successive compression the spring clip 77b thereby makes direct electrical contact with the first electrode 74 forming a current path between the first and second electrodes, as in the manner of the embodiment of FIGS. 5A & 5B.

Figure 6:
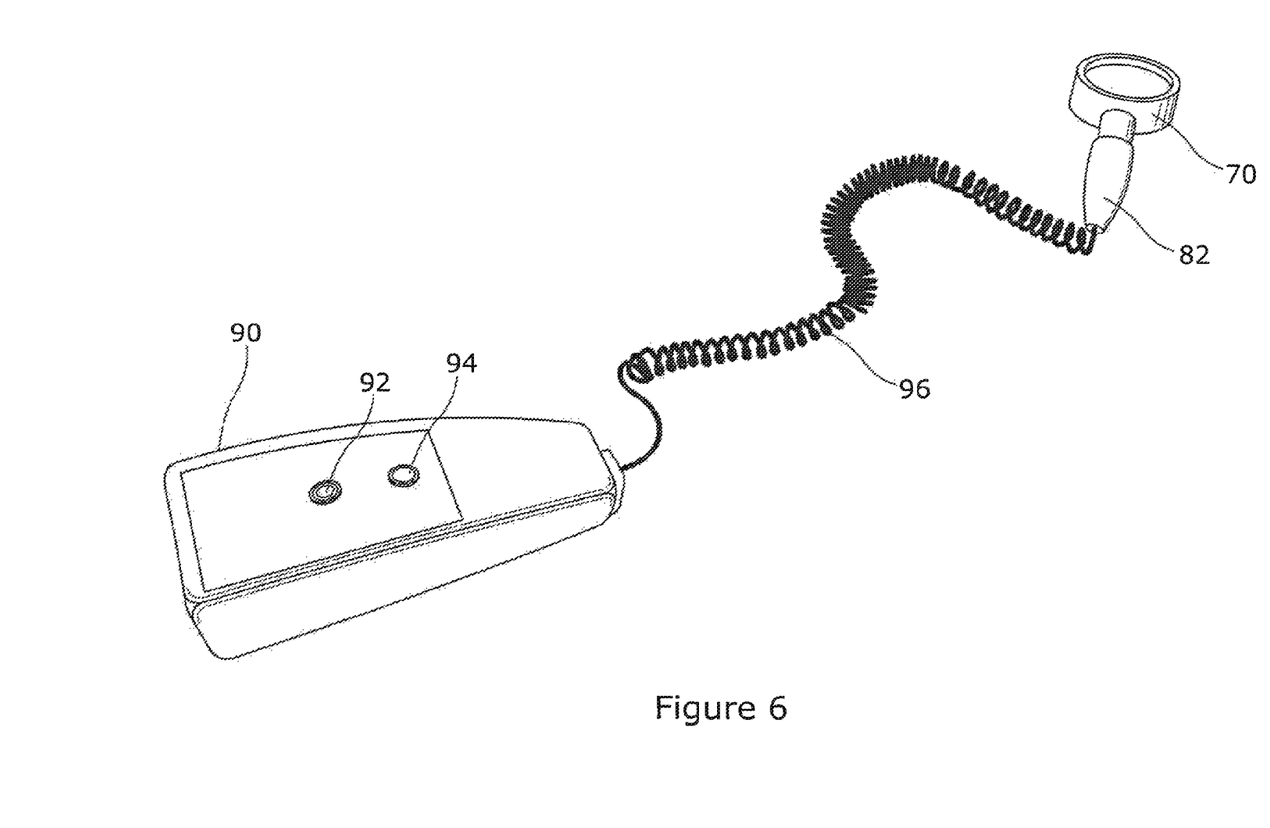
FIG. 6—shows another preferred embodiment of the load-indicating device and example probe of the present invention.
Figure 7:
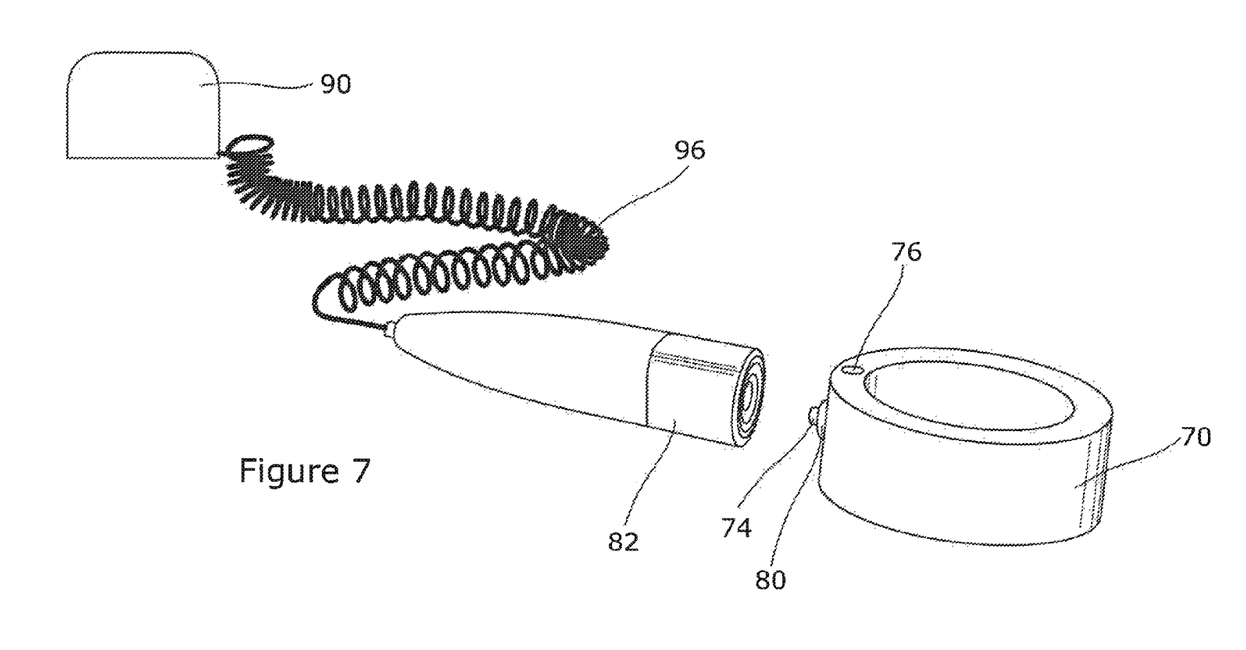
FIG. 7—shows a close-up view of the device and probe of FIG. 6.

The probe 82 is connected to a handheld monitoring device either via a cable or wire 96, or alternatively via a wireless connection, e.g. WiFi etc. As shown in FIGS. 6 & 7, the handheld monitoring device 90 comprises a display means in the form of a pair of LEDs 92 & 94 of different colour, for example red and green. When the electrical circuit is 'open', namely when the first and second electrodes 74 & 76 are spaced apart (i.e. when the body portion 72 is under-tensioned) the red LED 92 is illuminated;

whereas when the body portion 72 is tensioned to the predetermined compressive load, the red LED 92 extinguishes in preference to an illuminated green LED 94, namely when the first and second electrodes 74 & 76 come into electrical contact. Hence, an operator can easily and quickly determine when the desired load on the device 70 has been achieved.

Figure 8:
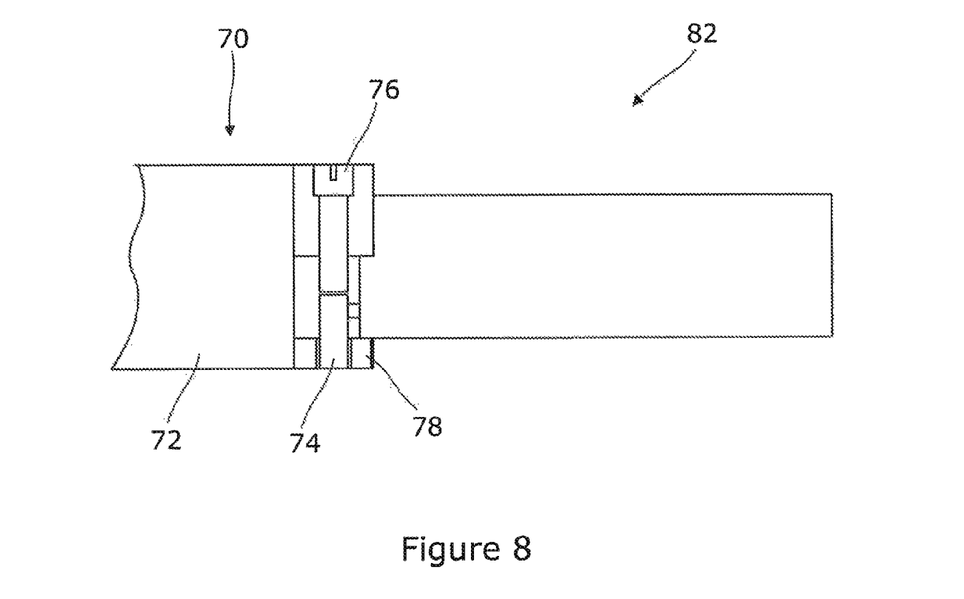
FIG. 8—shows a side cross-sectional view of another embodiment of the load-indicating device and of an example probe according to the present invention.

An alternative embodiment is shown in FIG. 8, in which the first and second electrodes are aligned substantially parallel and are (initially) separated by an adjustable air gap 78 (this is in contrast to the mutually orthogonal arrangement of the first and second electrodes in the embodiments of FIGS. 5A to 5C). As the body portion 72 is compressed, the second electrode 76 moves downwardly (in the sense of FIG. 8) to thereby come into direct electrical contact with the first electrode 74 as the air gap 78 closes. In this way an electrical circuit can be completed with the attached probe 82, thereby notifying an operator of the loading condition on the device 70 via a handheld monitoring device 90, of a type as shown in FIG. 6.

Figure 9A:
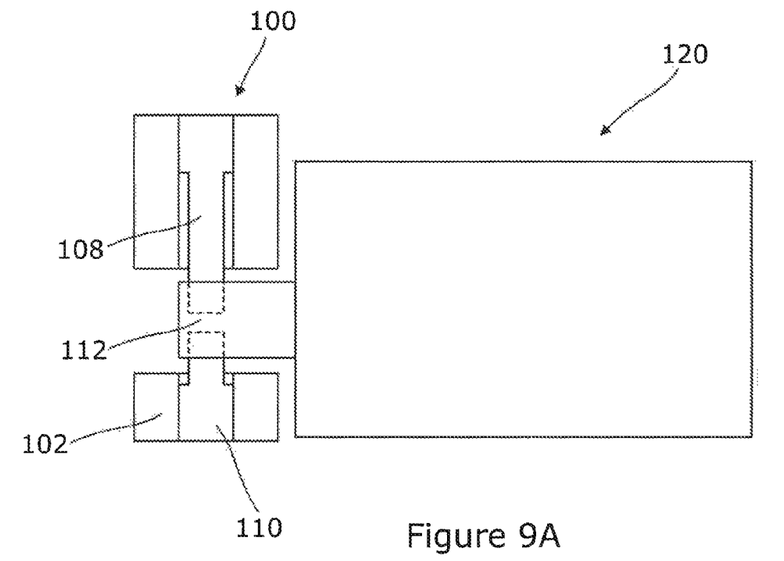
FIG. 9A—shows a side cross-sectional view of a different embodiment of the load-indicating device and of an attached example probe according to the present invention.
Figure 9B:
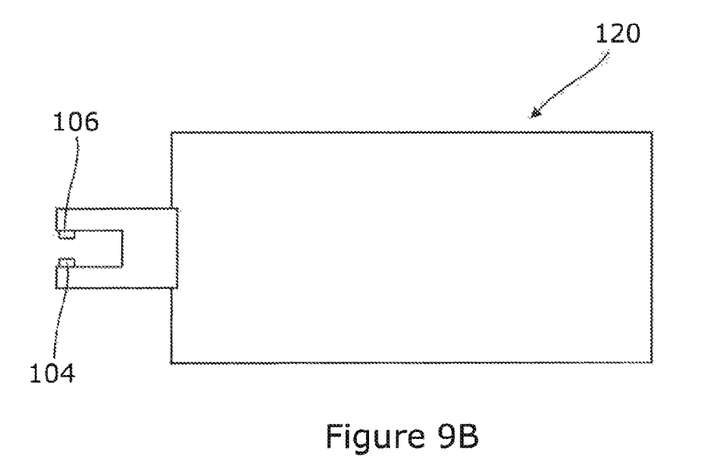
FIG. 9B—shows a top plan view of the example probe of FIG. 9A.

Referring to FIGS. 9A & 9B, there is shown a further embodiment of a load indicating device 100 according to the present invention. The device 100 comprises a body portion 102, a light source 104 and a light detector 106 for receiving light from the source 104. The body portion 102 may be in the form of a nut or washer, as described in preceding embodiments.

The device 100 further comprises a first opaque member that is operable to attenuate the passage of light between the source 104 and the detector 106. The opaque member is arranged to move in response to compression of the body portion 102 to thereby cause a change in the state of the light communicated between the source 104 and the detector 106 when a predetermined preload (or tension) is applied to the body portion 102.

In the embodiment of FIGS. 9A & 9B, the light source 104 is a photodiode and the light detector 106 is a phototransistor. The first opaque member takes the form of an adjustable screw 108 disposed in the body of the body portion 102, such that the screw 108 is substantially parallel to the bore of the body portion.

The adjustment screw 108 is opaque to at least visible and/or infra-red (IR) light and therefore is able to attenuate light transmitted between the photodiode 104 and the phototransistor 106.

In much the same manner as some of the preceding embodiments, the adjustment screw 108 is arranged to move with compression of the body portion 102. Therefore, as the body portion 102 is tensioned, the screw 108 displaces substantially along the direction of the bore axis.

As shown in FIG. 9A, the device 100 further comprises a second opaque member in the form of an abutment member 110 that is disposed within the body portion 102 and is aligned with the adjustment screw 108 substantially along the direction of the bore axis. The adjustment screw 108 and the abutment member 110 are separated by an adjustable air gap 112 when the body portion 102 is uncompressed below the predetermined preload. However, as the body portion 102 is subsequently tensioned, the adjustment screw 108 is therefore forced towards the abutment member 110 so that the air gap 112 gradually begins to close.

The photodiode 104 and the phototransistor 106 are disposed on opposite sides of the air gap 112, such that light communication is possible along a light path defined therethrough. But, as the compression of the body portion 102 increases, the adjustment screw 108 begins to abut against the abutment member 110, until such time the predetermined preload is achieved, whereupon the air gap 112 closes completely and the screw 108 and abutment member 110 come into direct contact. As a result, the light communicated between the photodiode 104 and phototransistor 106 is thereby interrupted (namely fully attenuated), causing a change in the state of the communicated light.

This change of state may consequently be used to notify an operator that the desired preload on the device has been achieved.

A controller 120 is configured to identify when this change of state occurs (i.e. when the phototransistor 106 no longer registers any incident light) and therefore provides a visual indication or other form of alert or message etc. to the operator that the device 100 is at the required tension.

Figure 10A:
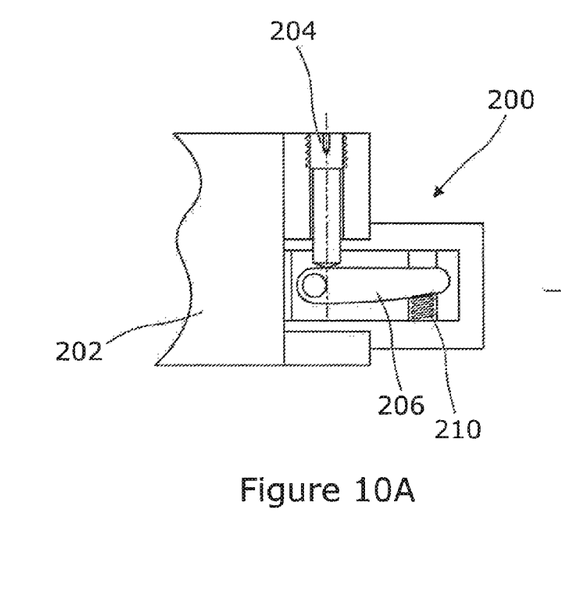
FIG. 10A—shows a side cross-sectional view of an alternative embodiment of the load-indicating device according to the present invention.
Figure 10B:
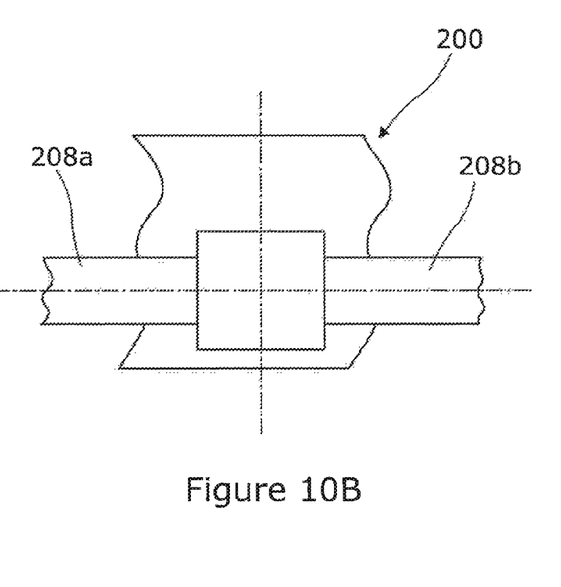
FIG. 10B—shows a top plan view of the device of FIG. 10A.

In alternative embodiment, as shown in FIGS. 10A & 10B, a reverse situation may be used to notify the operator that the required preload on the device 200 has been achieved. In this embodiment, the first opaque member is arranged to inhibit and attenuate the transmission of light between the light source and the light detector, such that only when the opaque member is displaced (due to tensioning of the device) is light able to pass between the source and detector.

In such an embodiment, the source and the detector are linkable via a pair of opposing fibre optics 208a & 208b, which define a light path therebetween. The first opaque member comprises a pivotable light shield 206, which is disposed between the opposing fibre optics 208a & 208b, such that it is aligned substantially transversely to the light path.

An adjustment screw 204 is disposed within the body portion 202 and is operable to displace the light shield 206 upon compression of the body portion. The adjustment screw 204 is aligned substantially parallel to the axis of the bore and consequently moves along this direction as the body portion 202 is compressed. The adjustment screw 204 is arranged to abut against the pivotable light shield 206, such that as the tension on the body portion 202 is increased the screw 204 pushes downwardly on the light shield (in the sense of FIG. 10A) causing it to pivot away from the blocked light path of the opposing fibre optics 208a & 208b.

As a result, the action of the pivoting light shield 206 is able to cause a change in the state of the light communicated between the source and the detector, with the light being able to pass uninhibited between the opposing fibre optics 208a & 208b with zero attenuation.

A controller in the form of an attachable device (not shown) can be configured to identify when the change of state occurs (i.e. when the detector receives light from the fibre optic) and may therefore provide a visual indication or other form of alert or message etc. to the operator that the device is at the required tension.

As shown in FIG. 10A, the light shield 206 is biased to return to its original (attenuating) position by a biasing means, such as a helical spring 210. The spring 210 thereby restores the light shield 206 to a position which interrupts the light communication between the opposing fibre optics 208a & 208b, when the tension is removed from the device 200.

As will be appreciated from the foregoing embodiments, the present invention is able to provide an improved, easy to fit, and cost-effective means of indicating accurate loading of a mechanical assembly. Therefore, although the load-indicating devices are ideally suited for ensuring a reliable and consistent tensioning of fastening components, it will be recognised that one or more of the principles of the invention may extend to other fastening or securing applications, whereby it is required to tension or load a mechanical connection to an accurate predetermined value or tolerance.

The above embodiments are described by way of example only. Many variations are possible without departing from the invention.

The invention claimed is:

1. A load indicating device, comprising:
   a body portion defining a bore extending therethrough;
   a movable member disposed in at least part of the body portion and configured to move in a direction substantially orthogonal to the axis of the bore; and
   an adjustment means coupled to the movable member and operable to displace the movable member when the body portion is compressed,
   wherein the adjustment means is coupled to the movable member via a resilient means.

2. The load indicating device of claim 1, wherein the resilient means is a spring clip.

3. The load indicating device of claim 1, wherein the movable member is configured to move in a substantially radial direction relative to the axis of the bore.

4. The load indicating device of claim 1, further comprising a biasing means operable to restore the movable member to its original position when the body portion is uncompressed.

5. The load indicating device of claim 1, wherein the movable member is in the form of a gauge pin.

6. The load indicating device of claim 5, wherein the gauge pin comprises an end cap.

7. The load indicating device of claim 5, wherein the gauge pin is located within a gauge pin housing at least partly disposed within the body portion.

8. The load indicating device of claim 7, wherein the gauge pin housing comprises a seal.

9. The load indicating device of claim 1, wherein the adjustment means comprises an adjustment screw.

10. The load indicating device of claim 9, wherein the adjustment screw is substantially parallel to the bore.

11. The load indicating device of claim 9, wherein the adjustment screw is disposed in the body portion.

12. The load indicating device of claim 1, further comprising a load detecting means operable to detect displacement of the movable member relative to the body portion.

13. The load indicating device of claim 12, wherein the load detecting means comprises an attachable probe including a linear transducer.

14. The load indicating device of claim 13, wherein the load detecting means further comprises a display means for indicating the compressive load on the body portion.

15. The load indicating device of claim 1, wherein the bore is threaded.

16. The load indicating device of claim 1, wherein the body portion is in the form of a nut or a washer.

* * * * *